Jan. 24, 1967   C. C. WITMER   3,300,065
MEANS FOR MATERIAL HANDLING
Filed July 18, 1963   6 Sheets-Sheet 2

INVENTOR.
CLINTON C. WITMER
BY Edward B. Gregg
ATTORNEY

Jan. 24, 1967    C. C. WITMER    3,300,065
MEANS FOR MATERIAL HANDLING
Filed July 18, 1963    6 Sheets-Sheet 1

INVENTOR.
CLINTON C. WITMER
BY
Edward B. Grey
ATTORNEY

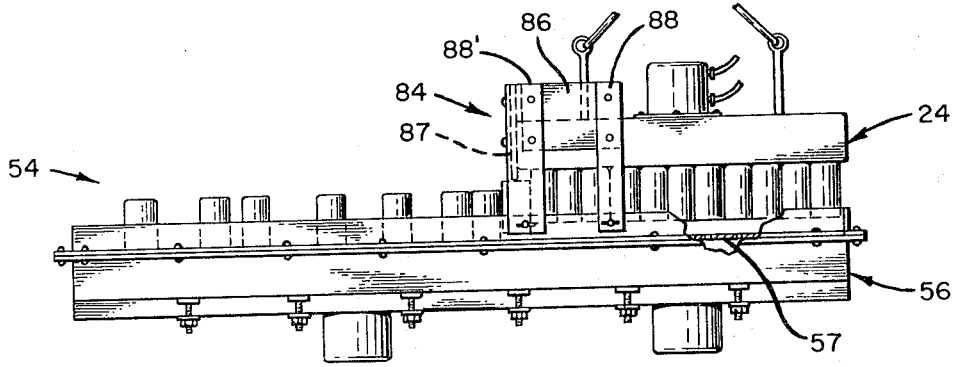
FIG-4-A
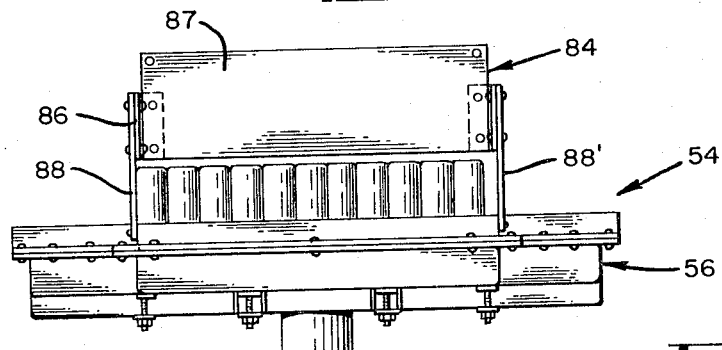
FIG-5-A
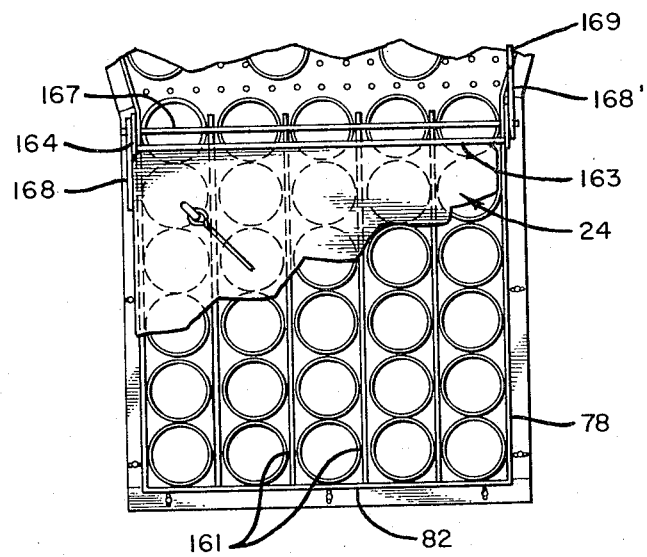
FIG—11
INVENTOR.
CLINTON C. WITMER
BY Gregg & Stidham
ATTORNEYS

INVENTOR.
CLINTON C. WITMER
BY
ATTORNEY

Jan. 24, 1967     C. C. WITMER     3,300,065
MEANS FOR MATERIAL HANDLING
Filed July 18, 1963     6 Sheets-Sheet 5

INVENTOR.
CLINTON C. WITMER
BY
ATTORNEY

INVENTOR.
CLINTON C. WITMER

United States Patent Office 3,300,065
Patented Jan. 24, 1967

3,300,065
MEANS FOR MATERIAL HANDLING
Clinton Clark Witmer, San Jose, Calif., assignor to Tri-Valley Growers, San Francisco, Calif., a corporation of California
Filed July 18, 1963, Ser. No. 296,046
11 Claims. (Cl. 214—6)

This invention relates to a method and means of handling objects which include a magnetic suspension and/or air cushion support for the objects handled.

In handling items of identical size it is common practice to stack such items in layers upon pallets for ease in transporting and storing the same. The stacking and removing of items from pallets, that is, palletizing and de-palletizing may be effected by hand. However, when large quantities of items are to be handled, such hand palletizing and de-palletizing is very time consuming and costly. For this reason palletizing and de-palletizing systems and machines have been built and used. Such prior art apparatus, however, suffers from one or more deficiencies such as excessive cost, limited application and versatility, and the like.

In order to stack items in more than a single layer, it is often desirable to arrange the layers of items in a pre-determined pattern, which pattern is repeated for each layer whereby items in an upper layer are positioned directly over items in a lower layer. Prior art methods and means often involve had labor for effecting such a pattern. Where the pattern-forming has been mechanized, the method and means employed are generally limited to a single size item or to items within a small range of sizes.

When conveying items from one place to another on a conveyor line such as an endless belt or the like, it is common practice to include an accumulator in the line to compensate for differences in the rate at which items are fed to and removed from the ends of the line. Prior art accumulators often include large revolving platforms, or the like, which require much space, frequent maintenance and are subject to wear and failure.

Often, only a portion of the items stacked on a pallet are required in filling a customers' order and, when this occurs, it is common practice to remove more than the required number of items for the order from the pallet and to place the same on a conveyor to a required processing station, such as a labeling machine. When the required number of items have been fed to the labeler, or other processing station, the excess items are returned to the pallet by hand. Such hand operation is time consuming and costly when large numbers of orders for the items are being filled.

An object of this invention is the provision of economical palletizing and de-palletizing method and means which are readily adapted for use on items having a wide variety of shapes and sizes, and which are generally usable at numerous locations along the item processing line.

An object of this invention is the provision of a crane supported hoist which carries a permanent magnet for lifting and transporting magnetic items, which arrangement may be used in many item handling situations including palletizing, de-palletizing, loading and unloading from processing containers, processing lines, storage containers, vehicles and the like.

An object of this invention is the provision of economical pattern forming method and means for arrangement of items in a random or recognized pattern, and which are readily adapted for use on a wide variety of shapes and sizes of items to be arranged.

An object of this invention is the provision of a pattern former which includes an inclined air cushion platform, over which the items being arranged in a pattern slide by force of gravity into the desired pattern.

An object of this invention is the provision of an accumulator for items conveyed between operating stations, which accumulator includes a stationary platform with no moving parts upon which items may be accumulated.

An object of this invention is the provision of an accumulator for use with a conveyor of items of a generally cylindrical shape, which items are moved onto the accumulator only by wedging interaction of the abutting items on the conveyor, the items returning to the conveyor from the accumulator when there is sufficient room between items on the conveyor.

An object of this invention is the provision of a conveyor comprising an air platform which is tiltable in at least two directions for sliding movement of items therealong on an air cushion in either of said two directions.

The above objects and advantages of this invention are obtained by use of a crane having a movable beam along which a hoist may be moved. The hoist supports a permanet magnet having a stripper plate associated therewith for stripping magnetic items from the magnet. The crane supported magnet is readily adapted for lifting and de-positing of magnetic permeable objects for palletizing and de-palletizing, loading and unloading and the like. This magnetic hoisting sytem may be used in conjunction with an air platform comprising a generally plane plate having a plurality of apertures therein through which air is directed upwardly for the support of items being handled on an air cushion. With the platform in a horizontal position, the items are easily moved therealong by hand for the proper positioning thereof. In accordance with this invention the platform may be inclined, or tilted, slightly whereby the objects slide therealong on the air cushion by the force of gravity. With suitable side rails along the inclined platform the objects may be made to assume a random or recognizable pattern thereon, and the objects so formed in a pattern may be removed from the table by the said permanent magnet and crane assembly. Further in accordance with this invention such an inclined air platform may be located adjacent a conveyor for use as an accumulator. In this use, the air platform is inclined slightly toward the conveyor and items may be accumulated thereon by the squeezing action between such items on the conveyor when more items are fed to the conveyor than are removed therefrom. The items are returned to the conveyor by action of gravity when there is space available on the conveyor. Still further in accordance with this invention an air platform of the above-mentioned type which functions to support items on an air cushion may be made adjustably tiltable in at least two inclined directions whereby items on the table may be made to move by gravity in either of said directions by adjustment of the inclination, or tilt, of the table. Such an adjustably tiltable table is of particular benefit where, for any reason, items being fed therealong in one direction must be returned to their starting position.

In the drawings, wherein like reference characters refer to the same parts in the several views:

FIGURE 4A is a view which is similar to FIGURE 4 and showing also a row of cans being stripped from the permanent magnet by a guide plate as the permanent magnet lifts the cans from the air platform;

FIGURE 5A is a view which is similar to FIGURE 5 except the guide plate is shown in a raised position to accommodate tall cans;

FIGURE 11 is a fragmentary top plan view of the FIGURE 10 arrangement showing a fragmentary portion of the permanent magnet positioned over the air platform.

Figure 1:
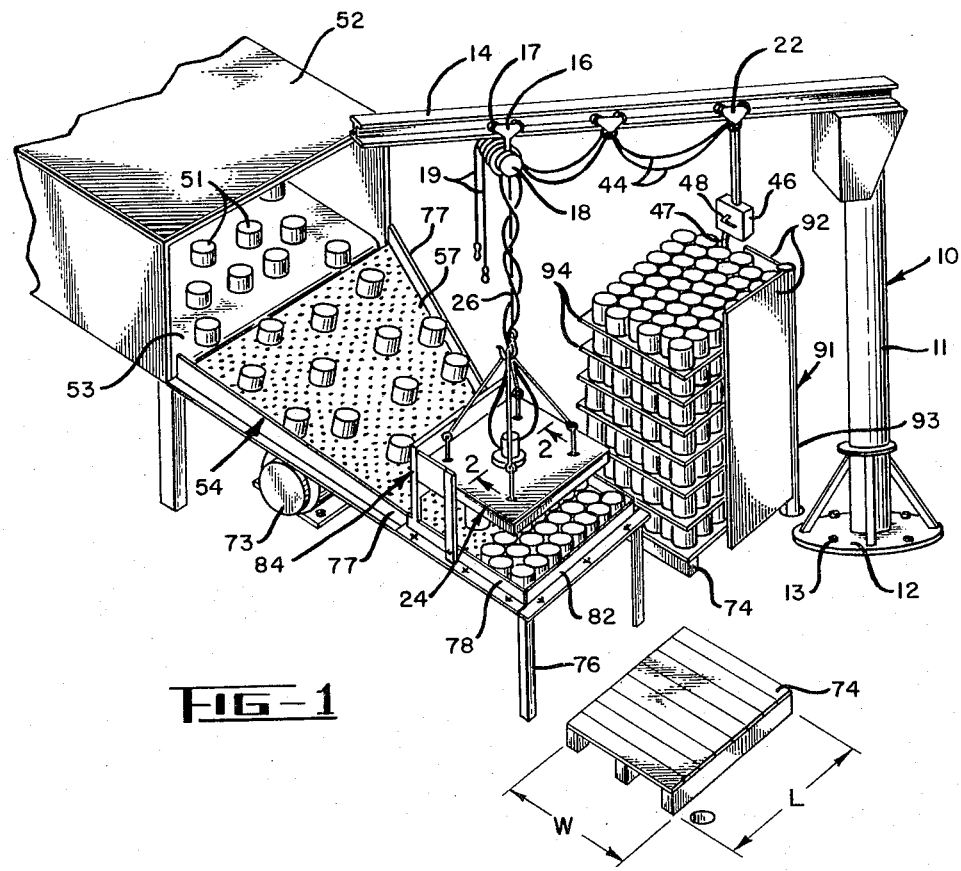
FIGURE 1 is a perspective view of a pattern forming and palletizing system embodying this invention.
Figure 2:
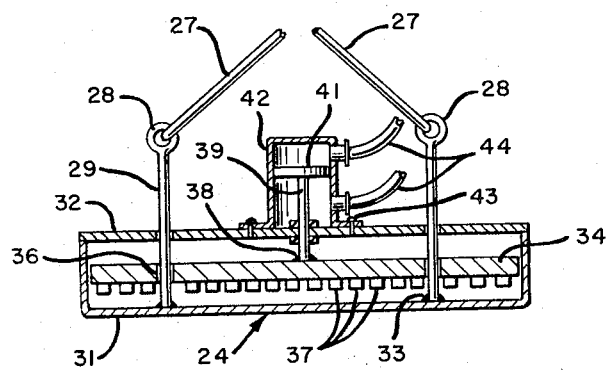
FIGURE 2 is a cross-sectional view taken along line 2—2 of the permanent magnet shown in FIGURE 1.

Reference is now made to FIGURE 1 of the drawings wherein there is shown a jib crane 10 which includes an upright post 11 having a radial flange 12 at the bottom end thereof bolted to the floor by bolts 13. A jib 14 comprising an I-beam is rotatably mounted at the top of the post 11, the jib preferably being rotatable through 360 degrees on suitable bearings, not shown. A hoist trolley 16 with wheels 17 is movable along the jib by hand, and supports an electric hoist 18. (Obviously, a hand or motor geared trolley 16 could be employed, if desired.) The hoist 18 includes a motor adapted for connection to a suitable source of electric power through a conductor, not shown, and operation of the motor is under control of pull cords 19. The hoist 18 supports a permanent magnet 24 through a hoist chain 26 and supporting lines 27 connecting the chain to eyes 28 at the end of rods 29 extending from the magnet structure (FIGURE 2).

Permanent magnet structures of the type 24 illustrated in the drawings are well known and this invention is not limited to any particular magnet structure. For purposes of illustration, there is shown in FIGURE 2 a permanent magnet structure 24 comprising a non-magnetic stainless steel pan 31 provided with a non-magnetic stainless steel cover 32. The rods 29 extend through the magnet structure and are welded or otherwise suitably secured to the pan 31 inside the bottom thereof. A magnet mounting plate 34 is located within the pan 31 and is vertically movable along the posts 29 which extend through holes 36 formed in the plate. A plurality of permanent magnets 37 are cemented or otherwise suitably secured to the bottom of the plate 34. Thus, while the device 24 is termed a "permanent magnet" in the specification and claims it will be apparent that it may comprise a plurality of permanent magnets which, acting together, have the effect of the single large magnet.

The magnet plate 34 is secured, as by weld 38, to a piston rod 39 fixed to a piston 41 movable within a fluid cylinder 42 mounted on the cover 32 as by screw fasteners 43. Fluid lines 44 from the cylinder 42, as seen in FIGURE 1, connect to a source of fluid pressure, not shown, through a fluid control valve 46 and hose 47. The lines 44 may be supported by the trollies 22, if desired. With the valve operator 48 of the valve 46 in one position, the piston 41 is raised thereby raising the magnet plate 34 and attached magnets 37 to the position illustrated in FIGURE 2. With the valve operator 48 moved to a second position, the piston 41 is lowered within the cylinder to thereby lower the magnets 37 to a position adjacent the bottom of the stainless steel housing or pan 31. The bottom of the pan 31 acts as a stripper plate for removal of magnetic objects carried by the magnet 24. Thus, when the magnets 37 are lowered into the pan 31 adjacent to the bottom thereof, a strong magnetic field is created through the bottom of the pan whereby the magnet 24 is adapted for support of magnetic materials. When the magnets 37 are raised within the pan 31 by action of the fluid cylinder 42, the magnetic field through the bottom of the pan is so weakened as a result of the separation between the magnet and pan bottom that objects carried by the magnet are released therefrom. Obviously, other suitable permanent magnet structures may be employed which include a relatively movable permanent magnet and stripper plate. Also, other operators for effecting relative movement of the magnet with the stripper plate may be employed such as electrical or remote mechanical arrangements; the particular permanent magnet and operator mechanism forming no part of this invention. Also, although a jib crane is shown, it will be understood that any other suitable crane may be employed for the movable support of the magnet 24. For example, an overhead traveling crane bridge could be employed in place of the jib crane, if desired.

The combination of permanent magnet 24 and crane 10 results in an economical load handling system. Not only is the system economical, but it is also very versatile in that it may be used in numerous loading and unloading operations involving the handling of magnetic permeable items. Items which may be handled by the arrangement include, for example, ferrous capped containers, metal containers, metal parts, or the like. With the permanent magnet suspended in the manner described above, complete layers or portions of a layer of such metallic items are easily raised by the magnet and crane and moved to any point within the operating area of the crane for deposit.

Figure 3:
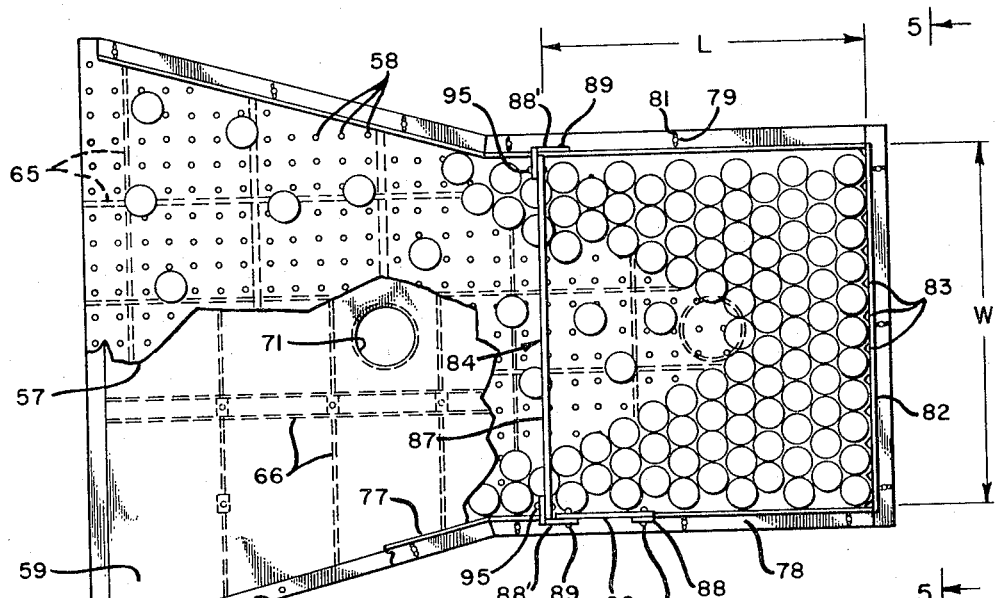
FIGURE 3 is a top plan view of the air platform employed in the palletizing system of FIGURE 1.
Figure 4:
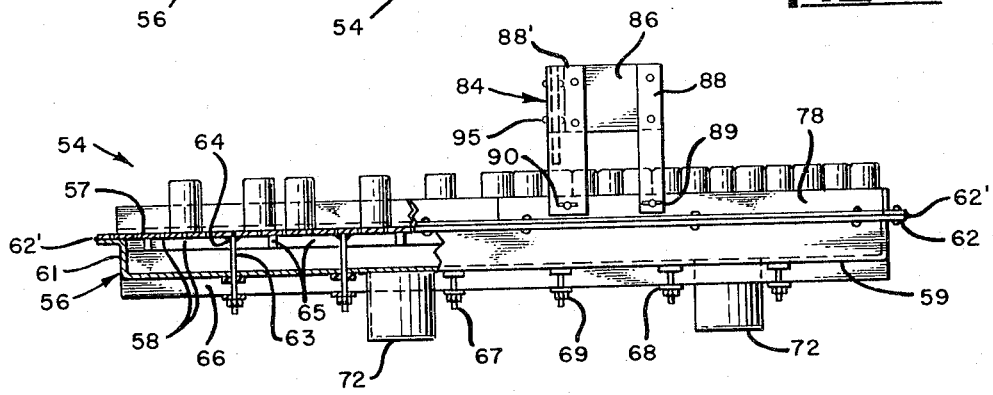
FIGURE 4 is a side view of the air platform of FIGURE 3, with parts shown broken away for clarity.
Figure 5:
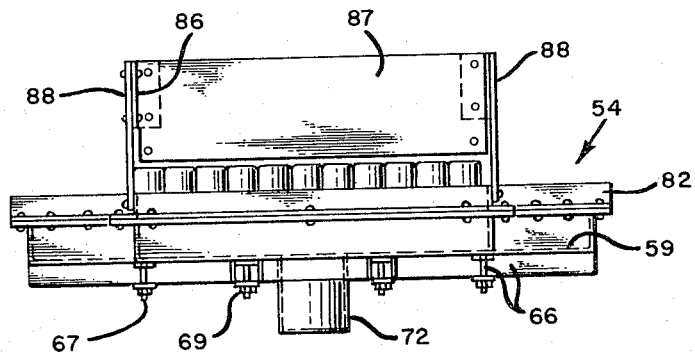
FIGURE 5 is an end view of the platform as viewed from the right in FIGURE 3.

In FIGURE 1 of the drawings the crane supported permanent magnet is shown included in a novel palletizing system for palletizing cans 51 shown coming from the output of a sterilizer or other processing apparatus 52 on a conveyor belt 53. The cans 51 are fed from the belt 53 onto an air platform 54 for support of the containers or cans 51 on an air cushion. In FIGURE 1, the platform 54 comprises a pattern forming device for formation of the cans 51 into a pattern. Reference is now also made to FIGURES 3, 4 and 5 of the drawings wherein the air platform 54 is shown comprising a plenum chamber which includes a pan 56 covered by a plane plate 57 having a plurality of apertures 58 therein. The pan 56 is formed with a plane bottom 59 having upturned sides 61, which terminate at the upper edge in an outwardly extending rim 62 upon which the cover 57 is secured as by welding 62′ or the like. Before the cover 57 is welded to the rim 62 of the plenum chamber, reinforcement rods 63 are welded to the bottom surface of the plate 57 as at 64, which rods extend through holes formed in the bottom 59 of the plenum chamber. Longitudinal and transverse stiffeners 65 and 66 are welded to the bottom of the plate 57 and to the bottom surface of the pan bottom 59, respectively, to add rigidity thereto. The lower end of the reinforcement rods 63 are threaded as at 67 and provided with washer and nut means 68 and 69 for holding the cover 57 to the plenum chamber pan.

The plenum chamber is pressurized through holes 71 formed in the bottom 59. Tubular sleeves 72 secured to the bottom 59 by welding or other suitable means, extend downwardly from the pan bottom 59 at the holes 71 and are adapted for connection to a source of air supply 73, shown in FIGURE 1. The holes 58 in the cover plate 57 are located sufficiently close together such that at least one hole underlies a can of the smallest diameter in any random position, to be used on the platform 54. The diameter of the holes 58 and the capacity of the blower 73 are such that the resulting static condition at the upper surface of the plate 57 is sufficiently greater than the projected weight per unit area of the object, container or part placed or moved onto the plate to cause it to "float" on an air layer or cushion. As an example, a static pressure condition of approximately one inch of mercury in the plenum chamber provides for an air flow through the holes at a rate of approximately .3 to 2 cubic feet per minute, depending upon the hole diameter, which may vary between say $\frac{1}{16}$ and $\frac{3}{16}$ inch. However, as mentioned above, the design conditions will vary depending upon the number of items, or containers, to be supported, the weight and the size thereof.

As seen in FIGURE 1, the air platform 54 is supported at one end thereof by the sterilizer 52 and at the other end thereof by legs 76. The legs 76 are of a height such that the air plate 57 of the platform is inclined downwardly away from the sterilizer. The angle of inclination of the plate 57 is chosen such that the cans 51 slide down the air cushioned surface thereof. In practice a very small angle of between 1 to 3 degrees incline is sufficient for most purposes. Thus, it will be seen that as the cans 51 are fed onto the air platform they slide toward the lower rear end portion thereof. When the plenum chamber is not pressurized, the objects 51 do not slide therealong since the angle of inclination of the plate 57 is insufficient to provide for such sliding movement without the air cushion support. Because the angle is so small, cans of different weight or size are easily handled without damage since the speed at which they slide on the small incline is not excessive.

In the system illustrated in FIGURE 1, the air platform 54 adjacent the sterilizer 52 is the same width as the sterilizer belt 53. From this point the sides of the platform converge to form a generally trapezoidal upper portion, as viewed from the top. Below the trapezoidal upper end, the platform is formed in a generally rectangular-shaped lower portion. The face of the rectangular-shaped lower portion is at least as large as the face of the pallets 74, shown in FIGURE 1, upon which the cans 51 are to be stacked. For purposes of illustration, the pallet dimensions designated L and W shown in FIGURE 1, are also shown in the top view of the air platform of FIGURE 3. A complete layer of cans or other magnetic objects may therefore, be formed in a pattern on the air platform at the lower rectangular-shaped end thereof, in preparation for transfer to the pallets.

Guide rails 77 and 78, and an end rail 82 are located at the side edges and at the lower end of the platform, respectively, for guiding the cans and preventing them from falling off the platform. The rails are of an L-shaped cross section and are fastened to the face plate 57 at the rim 62 of the plenum chamber by means of screw fastening devices 79 which extend through elongated holes 81 formed in the base of the rails, and thread into holes formed in the rim.

As mentioned above, the cans 51 are supported on an air cushion supplied by air through the holes 58, and slide down the inclined platform to the rectangular-shaped lower end thereof. The desired can pattern is formed at the lower end of the platform, and with the apparatus of this invention either a random or repetitive pattern of cans may be formed. A repetitive pattern is generally employed to assure even stacking and unstacking. Two repetitive patterns are commonly employed, i.e., the in-line and the nested patterns. With an in-line pattern the columns and rows of cans are all formed in straight lines. This pattern is often used since single rows of cans may be removed from any side of the layer with existing unloaders adapted for unloading one row at a time. With the nested pattern, which is illustrated in FIGURE 3, ten to fifteen percent more cans are included in each layer of stacked cans than with the in-line pattern thereby providing for more efficient use of warehousing space.

Figure 10:
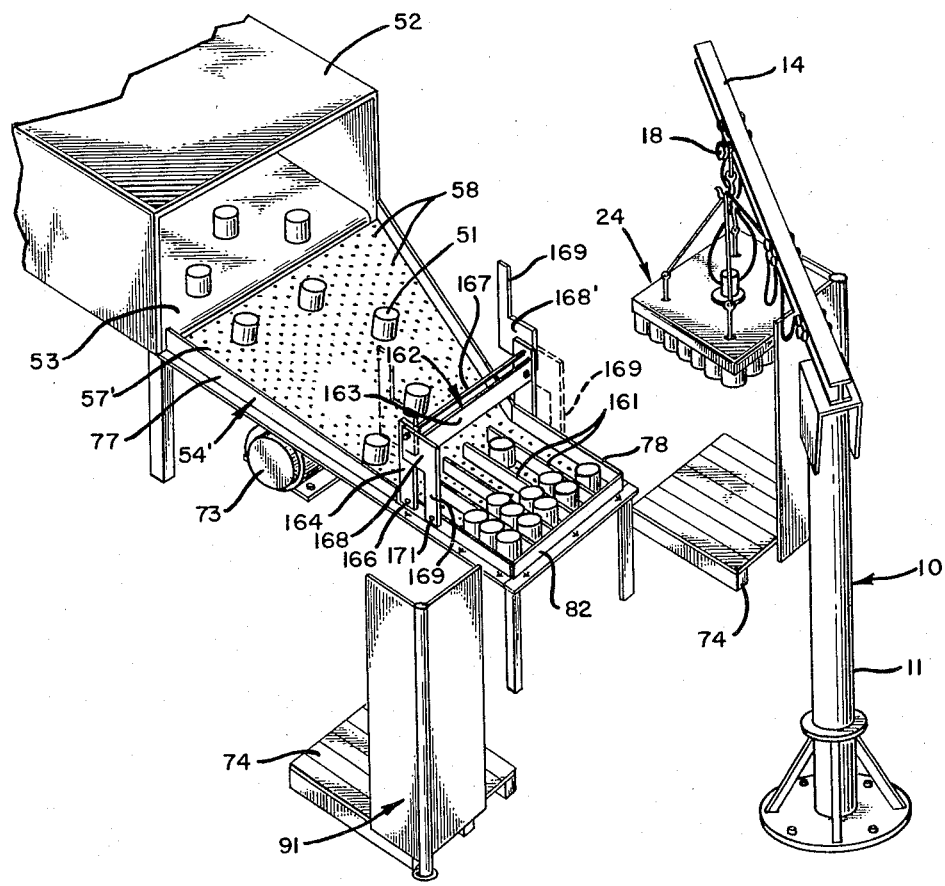
FIGURE 10 is a perspective view similar to FIGURE 1 only showing an arrangement for forming an in-line pattern of objects.

With the screws 79 loosened, the guide rails 78 are adjustable in a generally transverse direction of the platform for adjustment of the spacing therebetween. The distance apart at which the rails 78 are set is determined by the diameter of the cans 51 and by the desired pattern to be formed by the cans. Referring again particularly to FIGURE 3 there is shown a nested pattern of cans wherein each row of cans across the platform is arranged in-line while the columns of cans extending longitudinally of the platform are of a staggered or zig-zag arrangement. As seen in FIGURE 3, the cans in the first row adjacent to the end rail 82 together with the cans in the alternate or odd-numbered, rows are nested with the cans in the even-numbered rows. By proper adjustment of the side guides 78 the first row of cans will form properly. However, if desired, guide fingers 83 may be formed on the inner wall of the end rail 82 between which fingers cans will slide into the desired position. Cans of the following rows are guided into the illustrated nested pattern by means of the cans themselves in the adjacent preceding row. It will be apparent that with the same sized cans as illustrated in FIGURE 3, an in-line pattern of cans may be obtained with some hand guidance to prevent nesting of the cans. Alternatively, the plate 57 may be provided with guide means, as shown in FIGURE 10 and described below, for guiding the cans into an in-line pattern without resort to human guidance.

With enough cans on the platform at the lower end thereof to form a layer for the pallets, the entire layer of cans is picked up by the permanent magnet 24 and deposited on one of the pallets 74. In order to facilitate the accurate positioning of the layers of cans on the pallet, stacking guides are included on the platform and adjacent the pallets for guiding of the magnet with respect to said platform and pallet. The stacking guide on the platform is indicated by the reference numeral 84 and includes right angle, generally vertical, guide plates 86 and 87, which plates are secured to the guide rails 78 by means of legs 88 and 88′ extending upwardly therefrom and bolted to the guide rails 78 by screw fastening devices 89 extending through elongated holes 90 in the legs. The plate 86 is positioned over the one guide rail 78 and extends longitudinally of the platform whereas the plate 87 extends transversely across the platform and spaced thereabove. The height of the guide member 87 above the air plate 57 is such that the cans may pass thereunder with adequate clearance of say ¼ inch. The distance at which the guide plate 87 is spaced from the end rail 82 is such that the desired number of rows of cans for palletizing may be formed at the downstream side of the platform.

When a complete can pattern is formed on the platform, the magnet 24 is lowered onto the layer of cans with the plates 86 and 87 acting as guides for one corner of the magnet 24 for guiding the magnet into a predetermined alignment with the platform thereby accurately locating the magnet over the can layers. Not only does the plate 87 function as a guide for the magnet, but it also functions as a stripper plate for the row of cans directly below the plate. It will be noted that with the nested pattern of cans as illustrated, the row of cans directly below the plate 87 extends beyond the plate and interdigitates with the last row of cans in the pattern. The magnetic attraction of the permanent magnet 24, therefore, tends to lift such cans when lifting the pattern of cans. As seen in FIGURE 4A, as soon as the cans are lifted a short distance, however, the cans under the plate 87 strike the same and are prevented from being lifted along with the magnet. When the layer is lifted a sufficient distance, the magnetic attraction decreases to a point wherein the cans which are limited in upward movement by the plate 87 drop back onto the table or platform. When the cans within the pattern are lifted above the height of the cans on the platform, the cans remaining on the platform are then free to proceed by gravity downwardly therealong on the air cushion and against the end rail 82. The pattern forming process is thereby repeated and another layer of cans is prepared for stacking.

The crane may be swung about the post 11 and the hoist moved along the crane arm 14 to a position above one of the pallets 74. The stacking guide for the pallet is indicated by the reference numeral 91 and comprises a pair of right angle plates or walls 92 which are secured together and fastened to a post 93 which may be extended into a hole formed in the floor to position the same. The pallet 74 is located inside the right angle formed by the walls 92 and butted thereagainst. The magnet 24 carrying the layer of cans is guided by the walls 92 into alignment over the pallet, and the magnet is then lowered to place the layer of cans thereon. The layer of cans is released from the magnet and the above steps are then repeated to add layers of cans to the stack. Often, sheets 94 of paper, or the like, are placed between the layers of cans on the pallet. Because of the guide means employed on the platform and adjacent the pallets, the cans in each layer will be positioned directly over the cans in a lower layer thereof, whereby a properly stacked pallet is provided. Since the platform is inclined only a small amount, there is no requirement to incline the magnet 24 when lifting layers of cans from the platform. Yet, the small incline provided the platform is sufficient to cause or tend to cause the cans to move into pattern forming position thereon since friction of the cans on the platform is reduced to a minimum by the air cushion. By locating the pallets and the platform at a common radius from the hoist post 11, it will be apparent that the palletizing operation may be effected without the necessity of moving the hoist along the crane arm 14.

As mentioned above, when different diameter cans are to be palletized, or when the cans are to be formed in a different pattern, the guide rails 78 may be adjusted transversely of the platform to accommodate the cans and desired pattern. Similarly, the end rail 82 may be replaced with an end rail having properly spaced locating fingers 83 for accommodation of the cans and formation of the desired pattern. It will be understood that the patterns may be formed with a plain end rail 82 which does not include the fingers 83, if desired. The locating fingers 83 are of particular use where the pattern formed does not include a first row of cans extending completely across the platform between the guide rails 78. Also, the stacking guide 84 is adjustable longitudinally of the platform when the screws 89 are loosened to accommodate different diameter cans and different can patterns. The guide plate 87 is adjustably positioned vertically when the screws 95 securing the same to the legs 88 are loosened to accommodate different height cans. In FIGURE 5A the guide plate 87 is shown in a raised position to accommodate cans of greater height. A wide variety of can sizes and weights may be formed in the desired pattern with the palletizing apparatus of this invention, without damaging the cans and in a minimum of time with a minimum of labor.

Figure 6:
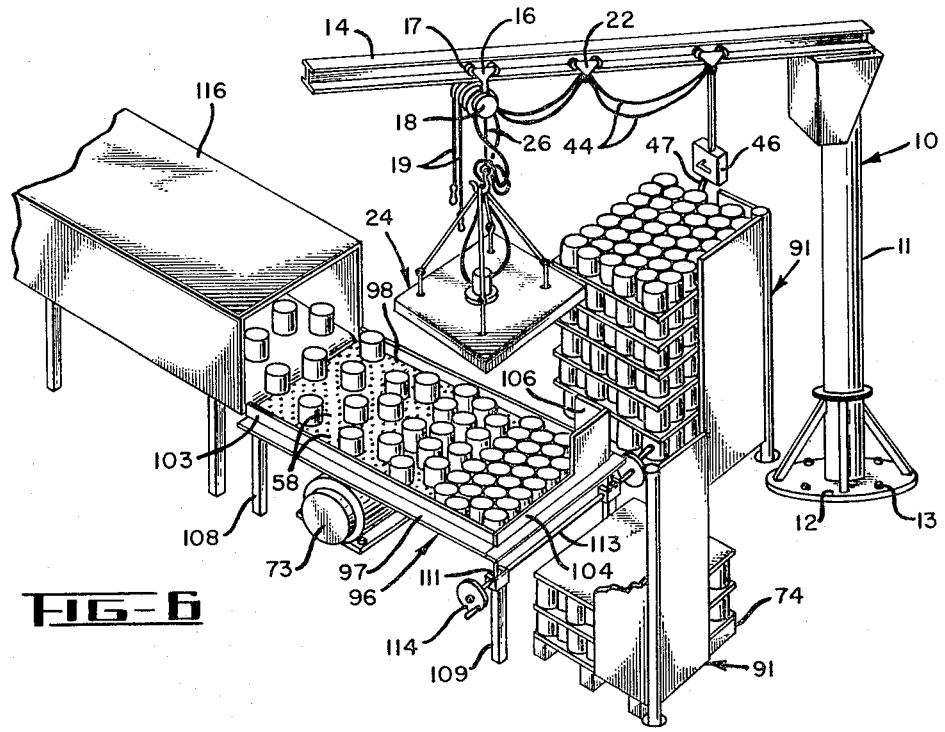
FIGURE 6 is a perspective view of a de-palletizing system embodying this invention.

Reference is now made to FIGURE 6 of the drawings wherein there is shown a novel de-palletizing system wherein cans may be removed from any of the pallets 74 and placed upon a conveyor designated generally by the reference numeral 96, for transfer to another station for further processing, or the like. As with the arrangement of FIGURE 1, the system shown in FIGURE 6 includes a jib crane 10 movable in a circle about the post 11 and carrying a hoist 18 movable along the jib 14, which hoist supports the permanent magnet 24. Controls 19 and 46 for control of the hoist and permanent magnet operation are included. With the apparatus of FIGURE 6, layers of cans from any of the pallets 74 may be lifted by the permanent magnet 24, and placed upon the conveyor 96.

The conveyor 96 is of the air cushion type and may be of a construction similar to the air platform 54 employed in the system of FIGURE 1. The conveyor is shown comprising a plenum chamber 97 having a cover or air plate 98 with a plurality of holes 58 therethrough. As with the platform 54, the air conveyor 96 is provided with a supply of air by means of a blower 73 connected through tubing and a flexible coupling (not shown) to the plenum chamber 97 to supply the air thereto. The same design considerations involved in the design of the air platform 54 are employed in the design of the conveyor 96 in the determination of the location and size of the holes 58 in the plate 98. Guide rails 103 are located along the opposite longitudinal edges of the platform and an end rail 104 is located at the one end thereof. A right angle stacking guide 106 is located adjacent one corner of the conveyor 96, directly above the guide rail 103 and end rail 104 for guiding the magnet 24 over the conveyor during raising and lowering of the magnet thereat.

In accordance with this invention the conveyor 96 may be inclined in either longitudinal direction for movement of the cans in either direction along the conveyor. This may be effected by use of legs 108 of a predetermined length at one end of the conveyor and adjustable legs 109 at the other end thereof; the legs 109 being adjustable to tilt, or incline, the conveyor in either longitudinal direction. In the drawings, the means for adjusting the height of the legs 109 is shown comprising threaded rods 111 rotatably supported at the upper end of the legs but fixed vertically therewith. The rods are coupled to threaded members carried by the conveyor 96, and are simultaneously rotated by an actuator rod 113 extending therebetween and coupled to the rods 11 through gear connections, not shown. When the actuator rod 113 is rotated by the handle 114 the rods 111 are simultaneously rotated to further engage or disengage with the threaded member on the conveyor to lower and raise the one end of the conveyor. The other end of the conveyor feeds onto any suitable receiving device, such as the can labeler 116 shown diagrammatically.

Cans placed on the air conveyor 96 by the magnet and hoist are supported on an air cushion by the air flowing upwardly out of the holes 58 in plate 98. With the legs 109 extended such that the conveyor 96 is inclined toward the can labeler 116, cans placed on the conveyor 96 at the one end thereof adjacent the hoist will travel therealong on the air cushion in the direction of the labeler by force of gravity.

In many operations, the cans are not labeled until an order has been received from the purchaser; the purchaser's label being applied to bright cans after the order is received. Often, the quantity of cans required is not equal to the number contained in a integral number of layers of cans. For example, an order may call for only the number of cans contained in one half of a layer of cans. With the illustrated arrangement the entire layer may be removed from the stacked pallet, placed on the table, and fed to the labeling machine. When the labeling machine operator has processed the required number of cans to fill the order, he may stop the labeler. The cans remaining on the conveyor 96 may then be returned to the other end of the conveyor adjacent the hoist by tilting the conveyor in the opposite direction by shortening of the legs 109. When this is done, the cans are returned to the lower end of the table and may be again lifted by the magnet 24 which is guided into position by use of the stacking guide 106. The cans picked up by the magnet are swung about by the crane and replaced on the pallet from which they came. In prior art labeling methods, either the excess cans are returned to the pallet by removing such cans from the conveyor and hand trucking the cans back to the pallet, or the precise number of cans required for a particular order are counted out before being placed upon the conveyor to avoid placing an excess number of cans thereon. In either case, excessive hand labor and time is involved. As with the air platform 54, the conveyor 96 need be inclined, or tilted, only a small amount to provide for sliding movement of the cans therealong. Damage to the cans, therefore, by such sliding movement and resultant bumping together is reduced to a minimum.

Figure 7:
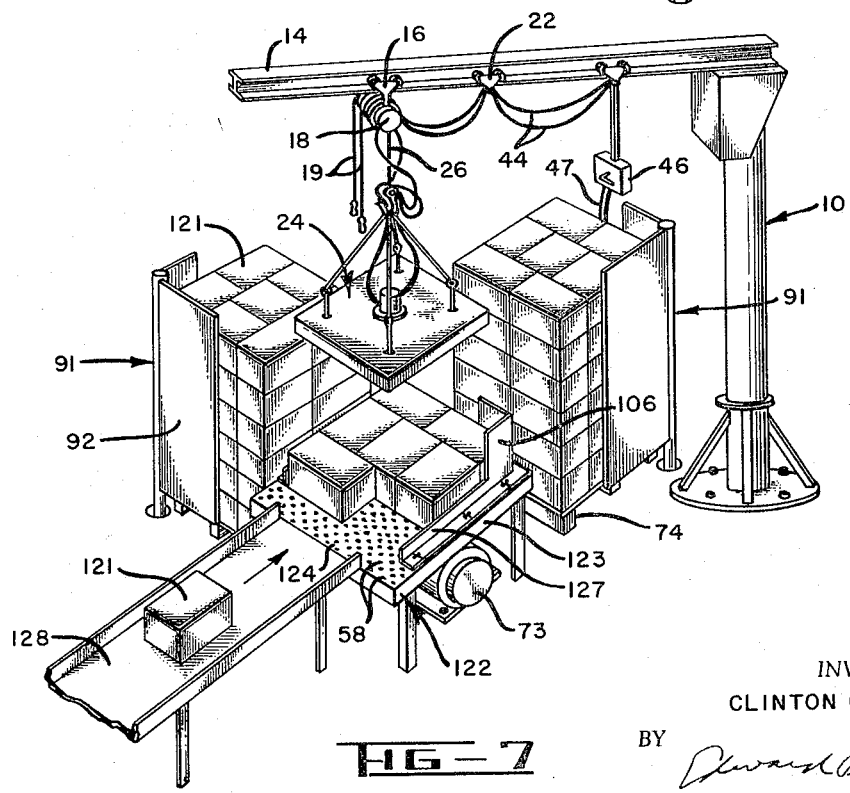
FIGURE 7 is a perspective view of a system for palletizing cases of cans or other magnetic permeable objects.

Reference is now made to FIGURE 7 of the drawings wherein there is shown a palletizing system for palletizing cases of canned goods, designated 121, or the like. The arrangement again includes the crane 10 and permanent magnet 24 for raising the cases 121 from an air platform or table 122 and lowering the same onto the pallets 74. The air platform 122 is similar to the air platform 54 and air conveyor 96 shown in FIGURES 1 and 6, and comprises a plenum chamber 123 having a face plate 124 with a plurality of holes 58 therein, which plenum chamber is supplied with air from a blower 73. Guide rails 127 are located at three sides of the air platform, and cases 121 of the canned goods are supplied to the platform at the fourth side from a conveyor 128. A stacking guide 106 is located at one corner of the platform above guide rails 127. When the cases reach the platform they are supported, or "float," on an air cushion supplied by air from the blower 73 through the holes 58. Such "floating" cases are very easily aligned by hand by the operator into the desired case pattern. The cases are then picked up by the magnet 24 by lowering the same onto the cases, the magnet being guided by the right angle stacking guide 106 to a predetermined aligned position with the platform. The cases are then lifted and deposited upon the pallets 74 which include the usual stacking guides 91 adjacent thereto. The stacking guides are employed in raising and/or lowering the magnet and assure a repetitive pattern and even stacking and unstacking. The face plate 124 of the air platform is horizontal; there being no need to incline the same in this application.

Figure 8:
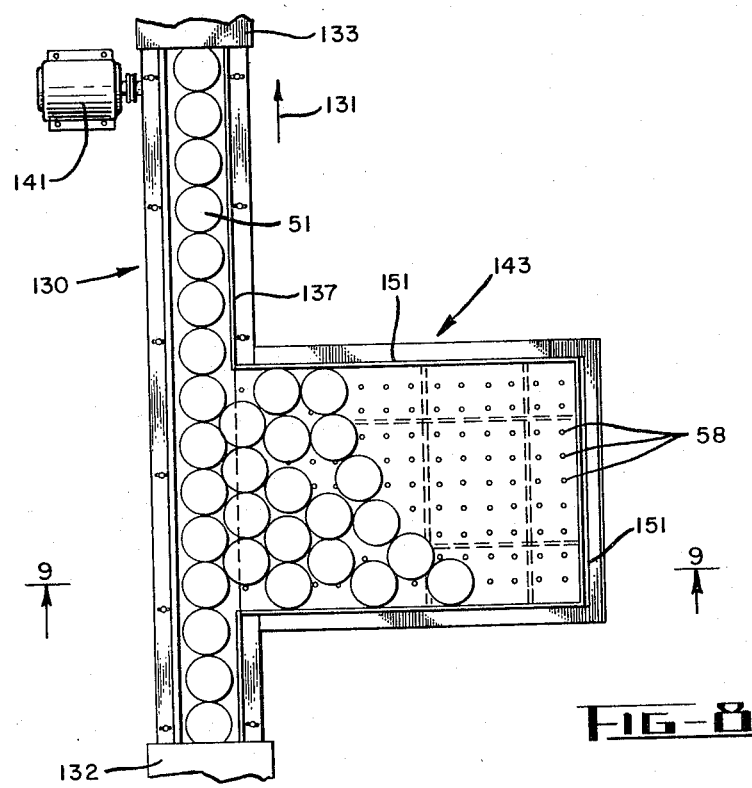
FIGURE 8 is a top plan view of an accumulator embodying this invention shown associated with a conveyor line.
Figure 9:
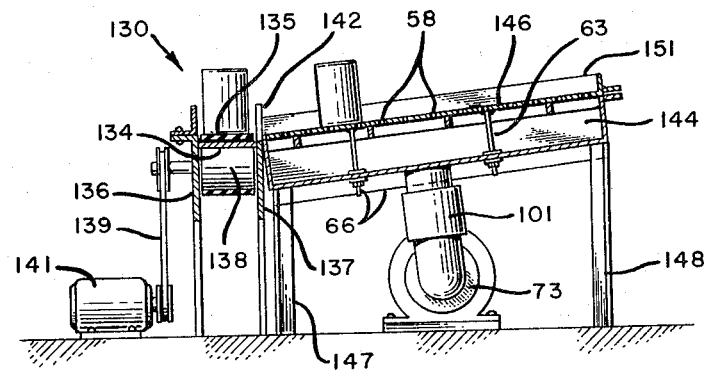
FIGURE 9 is a cross-sectional view taken along line 9—9 of FIGURE 8.

A novel accumulator which employs an inclined air platform is shown in FIGURES 8 and 9 of the drawings to which reference is now made. A conveyor 130 is provided along which a single row, or line, of cans 51 may travel in the direction of the arrow 131 from a first station 132 at the upstream side thereto to a second station 133 at the downstream side thereof. The illustrated conveyor is of the belt type and includes a belt 135 beneath which is positioned a plate 134 for the support thereof. The plate extends between the side walls 136 and 137 of the conveyor, and the side walls extend upwardly above the top of the belt 135 and act as guides for the cans 51 on the belt. The belt is driven by a suitable drive roller 138 connected by a belt 139 to a suitable drive source, such as a motor 141.

In accordance with this invention, the one side wall 137 is provided with a cut-out portion, designated 142, which cut-out portion extends below the level of the upper surface of the belt 135. Directly adjacent the cut-out portion 142 is an inclined air platform, designated 143, comprising the accumulator of this invention. Similarly to the air platforms and conveyor described above, the air platform 143 includes a plenum chamber 144 having a cover 146 provided with a plurality of holes 58 therethrough. The chamber is adapted for connection to a source of air comprising the blower 73 through the connection 101. As with the air platform shown in FIGURES 3 through 5, the illustrated platform includes tie-rods 63 and stiffeners 66. The air platform 143 is shown mounted on legs 147 and 148 adjacent the front and rear ends thereof, respectively. The rear legs 148 are longer than the front legs 147 such that the air platform is inclined toward the belt 134. The tilt of the platform is greatly exaggerated in the drawings for purposes of illustration, an incline of 1 to 3 degrees being sufficient in most instances. The edge of the air plate 146 adjacent the belt is at the same level as the belt whereby cans may easily pass from the belt onto the accumulator and back onto the belt from the accumulator. Side rails 151 prevent the cans from falling off the air platform.

In the operation of the accumulator cans are fed from the station 132 to station 133 along the conveyor belt 135, which stations may comprise, for example, filling and capping stations for filling the cans and then capping the same. The system, however, is not limited to such filling and capping operations or even to the use of cans or ferrous objects, since no magnetic lifting means are required. If the capper 133 accepts cans at a fast enough rate as they come off the belt 135, no accumulation of cans is effected. If, however, the filler operation feeds cans onto the belt at a greater rate than the cans can be utilized at the capping machine and removed from the downstream side of the conveyor, the cans will be accumulated on the air platform 143. Under such conditions the cylindrical cans are squeezed outwardly through the cut-out portion 142 of the rail 137 by action of the force of the belt on the cans. As more cans are fed onto the conveyor, the squeezing action continues and results in the sideward movement of the cans from the conveyor onto the air platform. As the cans accumulate they are pushed up the inclined surface of the platform on the air cushion provided by the air flowing through the holes 58 of the air plate 57. Such accumulation may obviously continue until the air platform is full, at which time accumulation must, of course, cease. As cans are drawn off the end of the conveyor line by the processing station 133, and room becomes available on the conveyor for the accumulated cans, the cans slide down the inclined air plate 146 and onto the conveyor.

Reference is now made to FIGURE 10 of the drawings wherein there is shown a perspective view of a pattern forming and palletizing system which is similar to FIGURE 1. The arrangement of FIGURE 10 is adapted for forming cans of a particular size in an in-line pattern. As with the arrangement of FIGURE 1, the system shown in FIGURE 10 includes a jib crane 10 movable in a circle about the post 11 and carrying a hoist 18 movable along the jib 14, which hoist supports the permanent magnet 24. Controls (not shown) for control of the hoist and permanent magnet operation are included.

A modified air platform 54' of the same general type as the platform 54 of FIGURE 1 is included. The platform 54', in addition to the top plate 57 and guide rails 77 and 78, includes a plurality of thin parallel separator members 161 extending longitudinally of the platform at the lower rectangular shaped end thereof, which members are secured to the top plate 57 as by welding, brazing or the like. The separator members 161, together with the guide rails 78 form a plurality of adjacent chutes or troughs which the cans 51 enter and slide to the end rail 82. The spacing between the guide members is just sufficient to permit the cans to enter the chutes and slide therealong. In this way, an in-line pattern of cans is formed on the air platform.

In the arrangement of FIGURE 10, the hoist 10 is shown spaced from the lower end of the air platform along the longitudinal axis extended of the platform, and the pallets are positioned at opposite sides of the platform. The rectangular shaped lower end portion of the platform is located the same distance from the hoist post 11 as are the pallets 74 whereby no movement of the hoist 18 along the beam 14 is required during the palletizing operation.

For ease in operation, a novel stacking guide 162 is employed which includes a guide and stripper plate 163 supported on legs 164 at the opposite ends thereof, which legs are secured by screw fasteners 166 to the guide rails 78. The legs extend toward the upstream side of the plate 163 and support a pivot member 167 which extends therebetween. Movable side guide members 168 and 168' having legs 169 are pivotally mounted on the outwardly extending portions of the pivot member 167 at the opposite ends thereof. The side guide members 168 and 168' are pivotal between the solid and broken line positions thereof shown in the drawings.

The left hand guide 168 (looking upstream of the can flow) is in operative position with the leg 169 secured by a screw fastener 171 to the rail 78. The other guide member 168' is shown pivoted about the pivot member 167 to the upstream side of the stripper plate 163. As so arranged, the system is particularly adapted for removal of the objects from the air platform and placement of the objects onto the pallet 74 to the right of the platform (again as viewed from the downstream side and looking upstream). When it is desired to place objects on the other pallet, the side guide members 168 and 168' are pivoted to the broken line positions thereof, and palletizing is begun. By including both right and left hand side stacking guide members 168 and 168' the magnet 24 may be swung into position over the platform from either rotary direction without having to raise the magnet above the top of the side guide members. Similarly, when removing cans from the air platform, the magnet need only be raised sufficiently high to clear the guide rails 78, and not so high as to clear the top of the guide member 168 or 168'. Obviously, other mounting means for the side guide members 168 and 168' may be employed, which would also permit movement thereof between operative and inoperative positions. In FIGURE 11 the magnet 24 is shown abutting the guide member 168 and stripper plate 163 for guiding the magnet and properly orienting the same. Also, as seen in FIGURE 11 the row of cans directly beneath the stripper plate 163 is stripped from the magnet 24 as the cans are raised in the manner described above with reference to the arrangement shown in FIGURES 1 to 5.

Having now described the invention in detail in accordance with the requirements of the patent statutes various other changes and modifications will suggest themselves to those skilled in this art. For example, if welding of the various reinforcement rods, stiffeners, separator members and the like, to the top plate results in warping thereof in the construction of the air cushion platforms and conveyors, such members may be secured to the top plate by screw fastening devices, or the like, to avoid such warping. Also, it will be understood that the inclination of 1 to 3 degrees of the air cushion conveyor and platforms mentioned above is not critical and the invention is not limited to such angles. However, as mentioned above, the objects will slide along platforms inclined only a small amount and this is of advantage in handling easily dented or damaged objects. It is intended that such changes and modifications shall fall within the spirt and scope of the inventions as recited in the following claims.

I claim:

1. Apparatus for forming a plurality of objects such as cans or the like into a pattern in preparation for stacking in layers on a pallet, or the like, the apparatus comprising a plenum chamber having an inclined flat top plate formed with a plurality of holes therethrough, means pressurizing the plenum chamber to provide streams of air from the holes for the support of the objects on an air cushion, the top plate being of sufficient width and length to accommodate a plurality of objects thereacross and therealong, respectively, the slope of the top plate being sufficiently steep for sliding of the objects downwardly therealong on the air cushion but insufficiently steep for sliding of the objects therealong when the plenum chamber is not pressurized, means forming the objects into a substantially stationary pattern on the top plate at the lower end thereof, and means for feeding objects onto the top plate at the elevated end thereof, said objects being free to move across and down the top plate under the force of gravity and into a substantially stationary pattern at the lower end of the top plate in preparation for removal therefrom.

2. The apparatus as recited in claim 1 wherein the means forming the objects into a pattern on the top plate includes side rails at opposite sides of the top plate and an end rail at the lower end thereof against which the objects are adapted to abut.

3. The apparatus as recited in claim 1 wherein the objects are of a magnetic permeable material, the apparatus including a movable permanent magnet for lifting the objects, a stripper plate extending across the top plate a vertically spaced distance thereabove and intermediate the elevated and lower ends thereof for stripping cans disposed therebeneath from the magnet as the cans are raised by the magnet, the objects being formed in rows across the top plate with one row directly beneath the stripper plate and extending therepast onto the lower end of the top plate, the said magnet being adapted to raise the objects formed in the pattern at the lower end of the top plate, if said one row of objects is lifted by the magnet the lifted objects of said one row striking the stripper plate and being stripped from the magnet when they are raised a predetermined distance above the platform by the magnet.

4. The apparatus as recited in claim 1 wherein the size of said pattern forming means is adjustable to accommodate objects of different size.

5. The apparatus as recited in claim 1 wherein said top plate is inclined at an angle of between about 1 and 3 degrees from the horizontal.

6. A can palletizing apparatus comprising a plenum chamber having an inclined flat top plate formed with a plurality of holes therethrough, means pressurizing the plenum chamber to provide streams of air from the holes for the support of the cans on an air cushion, said cans being free to move down toward the lower end of said top plate, the slope of the top plate being sufficiently steep for sliding of the cans downwardly therealong on the air cushion but insufficiently steep for sliding of the cans therealong when the plenum chamber is not pressurized, the top plate being of a width to accommodate a plurality of cans thereacross, means forming the cans into a pattern at the lower end of said inclined top plate, means feeding cans onto the top plate at the elevated end thereof, a permanent magnet for removal of said cans formed in a pattern from the lower end of said top plate, and a guide plate extending generally horizontally across the top plate a vertical spaced distance thereabove intermediate the elevated and lower ends thereof for guiding said magnet and for stripping cans disposed therebeneath from the magnet as the cans are raised by the magnet.

7. The apparatus defined by claim 6 wherein said means forming the cans into a pattern on the top plate includes side rails and an end rail at the opposite sides and lower end of the top plate.

8. The apparatus defined by claim 6 wherein said guide plate is vertically adjustable to accommodate cans of different height.

9. The apparatus defined in claim 6 wherein the length and width of said pattern forming means are adjustable to accommodate different width cans.

10. The apparatus as defined in claim 6 wherein said top plate is inclined at an angle of between about 1 and 3 degrees from the horizontal.

11. A can palletizing apparatus comprising a pattern former having first and second ends, means for moving cans from the first end to the second end of the pattern former, means for forming the cans into a substantially stationary pattern at the second end as the cans travel from the first end to the second end of the pattern former, a permanent magnet for removal of cans formed in a substantially stationary pattern from the second end of the pattern former, and a stripper plate fixed relative to the pattern former extending generally horizontally across the pattern former a vertical spaced distance thereabove intermediate the first and second ends for stripping cans disposed therebeneath and also at least in part outside of the magnet perimeter from the magnet as the cans are raised by the magnet.

References Cited by the Examiner

UNITED STATES PATENTS

| | | | |
|---|---|---|---|
| 1,977,497 | 10/1934 | Springer | 214—130 X |
| 2,466,693 | 4/1949 | Fisher | 214—309 |
| 2,538,972 | 1/1951 | Magnani | 193—1 X |
| 2,659,496 | 11/1953 | Botley | 214—6 |
| 2,753,058 | 7/1956 | Potthoff | 214—130 |
| 2,780,367 | 2/1957 | Perrelli | 214—10.5 |
| 2,858,009 | 10/1959 | Bainbridge. | |
| 2,944,687 | 7/1960 | Segur et al. | 214—152 |
| 3,007,585 | 7/1961 | Geisler | 214—6 |
| 3,066,811 | 12/1962 | Board | 214—152 |
| 3,075,625 | 1/1963 | Randall | 302—29 X |
| 3,079,191 | 2/1963 | Engelsted | 294—65.5 |

GERALD M, FORLENZA, *Primary Examiner.*

HUGO O. SCHULZ, MORRIS TEMIN, *Examiners.*

J. L. JONES, *Assistant Examiner.*